March 28, 1967     R. A. DI CURCIO     3,311,844
HIGH REPETITION RATE LASER SYSTEM
Filed May 31, 1963
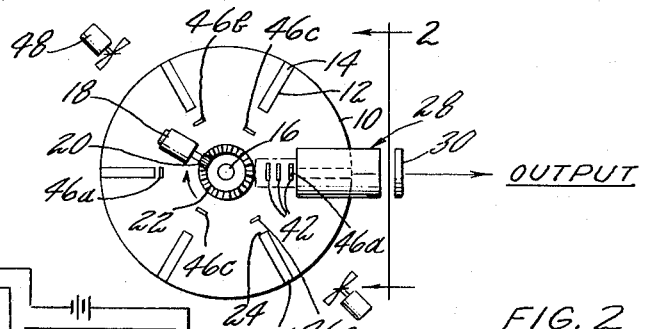
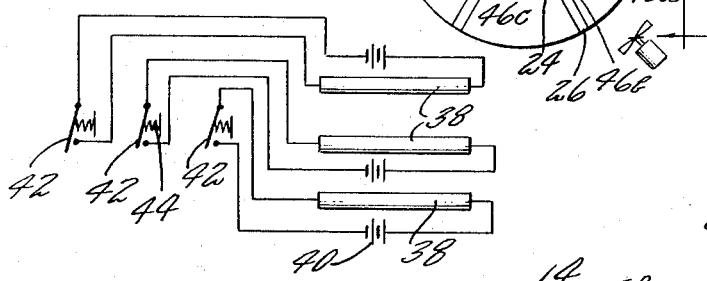
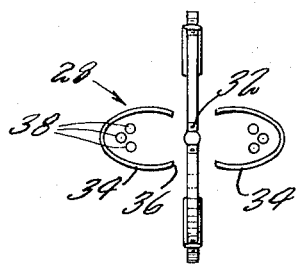
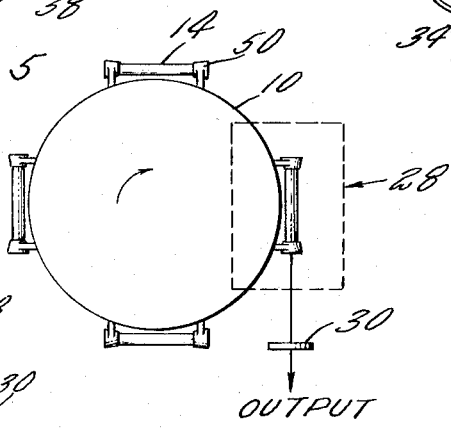
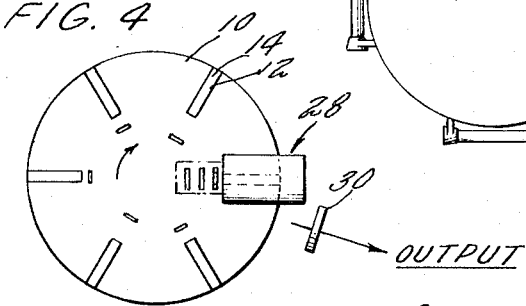
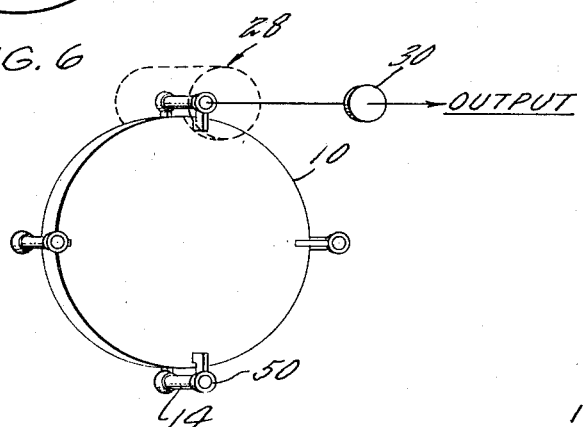
INVENTOR
ROBERT A. DICURCIO
BY David S. Fishman
ATTORNEY United States Patent Office 3,311,844
Patented Mar. 28, 1967

3,311,844
HIGH REPETITION RATE LASER SYSTEM
Robert A. Di Curcio, Windsor, Conn., assignor to United
Aircraft Corporation, East Hartford, Conn., a corporation of Delaware
Filed May 31, 1963, Ser. No. 284,560
5 Claims. (Cl. 331—94.5)

This invention relates to a laser system. More particularly, this invention relates to a solid state laser system having a high repetition rate of laser pulsing and in which the "Q" of the system can be optimized to achieve a single large pulse output rather than the usual train of uneven pulses.

At present, one of the limitations of pulsed solid state laser systems is that the laser material heats up after repeated pumping and will cease to function. Cooling schemes have been devised to conduct heat away from the laser rods, but the heat which is generated internally of the laser rod is difficult to remove rapidly by surface cooling. Consequently, even a well-cooled rod will heat up to the condition to where it can no longer be lased if it is flashed at too high a repetition rate. The result is that with present designs incorporating a single laser rod, the customary repetition rate of laser pulsing is of the order of one pulse every ten seconds and can perhaps be improved to the rate of one pulse every second if the power supply system, cooling, and rod quality are optimum.

In the present invention, several laser rods are mounted on a carrier such as a rotating wheel, and the laser rods are moved into a pumping chamber in a predetermined order where they are flashed in that predetermined order. In this manner, the rods are individually flashed and caused to lase in a predetermined sequence by being carried into and out of the pumping chamber. The repetition rate of the system as a whole is then divided among the several rods mounted on the carrier. For example, a system composed of ten rods and delivering ten pulses a second would require each rod to be pumped only once per second. Consequently, individual rods are not overworked. More effective cooling can be realized since, after each rod is pulsed, the rod is carried out of the pumping chamber into a region where it may be cooled away from the heat of the flash lamps and the cavity reflector. The repetition rate of this laser system is easily controlled in either increasing or decreasing direction simply by varying the number of laser rods or varying the speed of the carrier. In addition, this laser system can be operated to achieve single high energy bursts from the individual laser rods, rather than the usual train of spikes, by providing an external mirror system such that an appropriate delay can be introduced between pumping and lasing to optimize the "Q" of the system.

The high repetition rate and high output capabilities of the present invention can be used in applications such as, but not limited to, weapons, communications, chemical catalysis, machining and welding, and power and information transmission.

Accordingly, one object of this invention is to provide a novel laser system having a high repetition rate of laser pulsing.

Another object of the present invention is to provide a novel laser system in which a plurality of individual laser rods are mounted on a carrier and are moved into and out of a pumping chamber for lasing action in a predetermined order.

Another object of the present invention is a novel laser system in which a plurality of laser rods are mounted on a carrier and are moved into and out of a pumping chamber for lasing action, and in which the repetition rate of the system can be varied by varying the number of individual laser rods or by varying the speed of the carrier.

Another object of the present invention is a novel laser system in which an external mirror system is used to introduce a delay between pumping and lasing so that a series of very high energy bursts can be realized rather than the usual train of spikes from each individual laser rod.

Other objects and advantages will be apparent from the specification and claims, and from the accompanying drawings which illustrate an embodiment of the invention.

FIGURE 1 is a view of one embodiment of the present invention wherein the individual laser rods are mounted in radial openings in a rotating disc.

FIGURE 2 is a view taken along line 2—2 of FIG. 1.

FIGURE 3 is a schematic diagram of the operation of the pumping chamber lights.

FIGURE 4 is a modification of the system of FIG. 1 through which the "Q" of the system is optimized.

FIGURE 5 is a modification of the system of FIG. 1.

FIGURE 6 is another modification of the system of FIG. 1.

Referring now to FIG. 1, a wheel 10 has a plurality of radial openings 12, and an active laser element 14, such as a ruby rod, is mounted in each of the openings 12. Wheel 10 is rotatably mounted such as through a shaft 16 extending from each side of the wheel and properly supported in appropriate bearings, and wheel 10 is rotated by motor 18 which drives gear 20 which meshes with ring gear 22 on wheel 10.

The inboard end 24 of each rod 14 has a highly reflective coating, and the outboard end 26 of each rod is either uncoated or is coated with an antireflective material. As wheel 10 is rotated, the rods 14 move sequentially into and out of pumping chamber 28, and one or more lamps in pumping chamber 28 are flashed in coordination with the passage of the rods through the pumping chamber to deliver pumping energy to the rod in the chamber. An outboard mirror 30 is placed to be in alignment with the central position of the laser rod in the pumping chamber, and mirror 30 is made to be less reflective than the coating on the inboard end 24 of the rod. When the axis of the laser rod in the pumping chamber is perpendicular to the surface of mirror 30, mirror 30 cooperates with reflective end 24 to define a resonant cavity, positive feedback occurs, and lasing action takes place with the output passing through mirror 30 as indicated. This lasing action occurs as each of the rods 14 is passed through pumping chamber 28, in sequence or in any other predetermined order, by coordinating the operation of the pumping chamber with the passage of the individual rods through the pumping chamber.

Referring now to FIG. 2, the details of pumping chamber 28 are shown, and it can also be seen that the rods 14 are held in the openings 12 by means of retainers 32 screw fastened to the rim of wheel 10. Pumping chamber 28 includes a pair of reflectors 34 on opposite sides of wheel 10. Each reflector 34 is of elliptical cross section and has an opened end 36 along the major axis of the ellipse, and the reflectors are aligned along their major axes. A plurality of flash lamps 38 are clustered in each elliptical reflector about the focus of the ellipse removed from the opened end, and each elliptical reflector is so positioned that a laser rod 14 when passing through the pumping chamber is at the focus of each ellipse nearest the opened end of the ellipse when in alignment with the major axis of the ellipse.

As can be seen in FIG. 3, each of the pumping lamps 38 is powered by a separate battery 40, and the light are individually actuated by switches 42. Each of the switches 42 is normally held opened by a spring 44, and the switches 42 are aligned in a linear bank (see also FIG. 1). A plurality of cams 46a, 46b and 46c extend from the surface of wheel 10, and these cams are aligned with and correspond to individual laser rods. In addition, a set of three consecutive cams, such as 46a, 46b and 46c, are displaced radially with respect to each other and are positioned so that each one will contact a different switch 42 when passing under the switching bank as shown in FIG. 1. In this manner, the lamps 38 will be fired sequentially to avoid excessive heat build up in any one lamp. In the configuration shown in FIG. 1 where there are six laser rods, each of the lamps 38 would be flashed twice in one complete revolution of wheel 10. Of course, it will be understood that the number of lamps could vary from one located at the focus to any reasonable number which could be grouped about the focus, a plurality of lamps being preferred to avoid overheating any one lamp.

It is desirable to cool each laser rod after the rod has been pulsed. To this end, one or more cooling devices such as fans or blowers 48 are placed around the periphery of wheel 10 to deliver a flow of cooling air to the laser rods after they have been pulsed. Of course, other types of cooling systems such as liquid hydrogen baths could be employed. Since each laser rod is carried out of the pumping chamber after it has been pulsed, the effectiveness of the cooling system is greatly increased since the rods are cooled away from the heat of the lamps and cavity reflector.

Referring now to FIG. 4 wherein similar parts are numbered as in FIG. 1, a modification of the system of FIG. 1 is shown wherein the "Q" of the laser system is optimized for the generation of large bursts of energy. The system depicted in FIG. 4 is identical to the system of FIG. 1 with the exception of the fact that outboard mirror 30 is angularly displaced from the pumping chamber in the direction of rotation of wheel 10. The lamps are actuated as in the FIG. 1 system to pump the individual rods in pumping chamber 28, but the angular displacement of mirror 30 introduces a delay in the feedback of electromagnetic radiation to the pumped rod. Feedback is not initiated until the axis of the pumped rod is perpendicular to the surface of mirror 30, and hence an overpopulation of excited atoms occurs with a resultant large burst of energy when feedback from mirror 30 to the pumped rod initiates lasing action.

The system shown in FIG. 5 is a variation of the system of FIG. 1 wherein the rods 14 are mounted in carriers 50 which are fixed to the rim of wheel 10. Each rod is perpendicular to a radius of wheel 10, and each rod is rotated into pumping chamber 28 and into alignment with properly placed mirror 30 for lasing action.

FIG. 6 shows another modification wherein the laser rods 14 are mounted in carriers transverse to the rim of wheel 10, and the rods are rotated into pumping chamber 28 for lasing action when in alignment with properly placed mirror 30.

Of course, in the systems of both FIG. 5 and FIG. 6, the mirror 30 could be displaced in the direction of rotation of wheel 10 to optimize the "Q" of the system for the generation of large laser pulses.

It is to be understood that the invention is not limited to the specific embodiment herein illustrated and described but may be used in other ways without departure from its spirit as defined by the following claims.

I claim:

1. A laser system including a carrier, a plurality of active laser elements mounted on said carrier in spaced relation to each other, means defining a resonant cavity for said laser elements, said resonant cavity including reflecting means for said laser elements, at least part of said reflecting means being in spaced relation with said laser elements a pumping chamber in spaced relation with said carrier, said pumping chamber including an open ended pumping reflector of elliptical cross section and at least one energy supply means substantially at the focus removed from said open end to deliver pumping energy to said laser elements when in said resonant cavity, said open end of said pumping reflector facing said carrier and said pumping reflector being positioned so that any of said laser elements when in alignment with the major axis of the ellipse is at the focus of the ellipse nearest said open end, means for moving said carrier to pass said laser elements by said open end of said pumping reflector, said reflecting means being aligned with respect to a laser element in said pumping chamber to form a resonant cavity, a plurality of cam means corresponding to each of said laser elements, and operating means periodically actuated by said cam means individually when the corresponding laser element is at the focus to operate said energy supplying means and deliver pumping energy to said corresponding laser.

2. A laser system as in claim 1 wherein said pumping chamber includes a plurality of energy supplying means grouped about said first-mentioned focus, and a plurality of operating means each associated with an energy supply means, said cam means actuating said operating means in predetermined order to supply pumping energy to the laser corresponding to each cam means.

3. A laser system including a carrier, a plurality of active laser elements mounted on said carrier in spaced relation to each other, a pumping chamber in spaced relation with said carrier, said pumping chamber including an open ended pumping reflector of elliptical cross section and at least one energy supplying means substantially at the focus removed from said open end to deliver pumping energy to said laser elements when in said pumping chamber, said open end of said pumping reflector facing said carrier and said reflector being positioned so that any of said laser elements when in alignment with the major axis of the ellipse is at the focus of the ellipse nearest said open end, means for moving said carrier to pass said laser elements by said open end of said pumping reflector, a plurality of cam means corresponding to each of said laser elements, operating means periodically actuated by said cam means individually when the corresponding laser element is at the focus to operate said energy supplying means and deliver pumping energy to said corresponding laser, and means defining a resonant cavity for said laser elements, said resonant cavity including a reflecting surface displaced from said pumping chamber in the direction of movement of said carrier, said reflecting surface being positioned to be in alignment with a laser element after passing said pumping chamber reflector to define a resonant cavity to feed back laser emission and cause lasing action.

4. A laser system including a carrier, a plurality of active laser elements mounted on said carrier, means defining a resonant cavity including reflecting means for said laser elements, a pumping chamber having a pumping source in spaced relation with said carrier, said pumping source being positioned to deliver pumping energy to said laser elements when in said pumping chamber, to create a state of population inversion means for moving said carrier to pass said laser elements through said pumping chamber and said resonant cavity and into alignment with the resonant cavity while in said state of population inversion in predetermined order, and means for actuating said pumping source at substantially the same time each of said laser elements is in said pumping chamber to lase said laser elements in said predetermined order.

5. A laser system including a carrier, a plurality of active laser elements mounted on said carrier in spaced relation to each other, means defining a resonant cavity for said laser elements, said resonant cavity including reflecting means for said laser elements, at least part of said reflecting means being in spaced relation with said laser elements, a pumping chamber having a pumping source in spaced relation with said carrier, said pumping source being positioned to deliver pumping energy to said laser elements when in said resonant cavity, means for moving said carrier to sequentially pass said laser elements through said pumping chamber and said resonant cavity and into alignment with said resonant cavity, means for actuating said pumping source, and means for coordinating actuation of said pumping source with the passage of said laser elements through said resonant cavity to actuate said pumping source at substantially the same time each of said laser elements is in alignment with said resonant cavity to sequentially lase said laser elements.

No references cited.

DAVID H. RUBIN, *Primary Examiner.*

JEWELL H. PEDERSEN, *Examiner.*

W. L. SIKES, *Assistant Examiner.*